United States Patent
Okazawa

(10) Patent No.: US 9,398,207 B2
(45) Date of Patent: *Jul. 19, 2016

(54) IMAGING APPARATUS AND IMAGE CORRECTION METHOD, AND IMAGE PROCESSING APPARATUS AND IMAGE PROCESSING METHOD

(71) Applicant: OLYMPUS CORPORATION, Hachioji-shi, Tokyo (JP)

(72) Inventor: Atsuro Okazawa, Hino (JP)

(73) Assignee: OLYMPUS CORPORATION (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/795,936

(22) Filed: Jul. 10, 2015

(65) Prior Publication Data

US 2015/0319358 A1 Nov. 5, 2015

Related U.S. Application Data

(63) Continuation of application No. PCT/JP2014/050157, filed on Jan. 8, 2014.

(30) Foreign Application Priority Data

Jan. 10, 2013 (JP) ................. 2013-002480

(51) Int. Cl.
*H04N 5/232* (2006.01)
*G03B 13/36* (2006.01)
(Continued)

(52) U.S. Cl.
CPC ............ *H04N 5/23212* (2013.01); *G03B 13/36* (2013.01); *H04N 5/3696* (2013.01); *H04N 9/045* (2013.01); *H04N 2101/00* (2013.01)

(58) Field of Classification Search
CPC .......... H04N 5/23212; H04N 5/23229; H04N 5/3696; G03B 13/36
See application file for complete search history.

(56) References Cited

U.S. PATENT DOCUMENTS 9,088,710 B2 * 7/2015 Okazawa ........... H04N 5/23212
2010/0045849 A1 * 2/2010 Yamasaki ............... G03B 3/10
348/349

(Continued)

FOREIGN PATENT DOCUMENTS

JP 3592147 B2 11/2004
JP 2006166271 A 6/2006
(Continued)

OTHER PUBLICATIONS

Office Action issued in corresponding Japanese Patent Application No. 2014-163910 on Jun. 23, 2015, consisting of 10 pp. (English translation provided).

(Continued)

*Primary Examiner* — Daniel M Pasiewicz
(74) *Attorney, Agent, or Firm* — Volpe and Koenig, P.C.

(57) ABSTRACT

An imaging apparatus includes an image-capturing element, an optical axis position estimation processor, and a pixel correction unit. The optical axis position estimation processor includes a relationship calculator and an optical axis position calculator. The relationship calculator calculates a relationship between a pixel output of a phase difference detection pixel and an image height. The optical axis position calculator calculates an optical axis position of an optical system. The pixel correction unit corrects pixel outputs of the respective phase difference detection pixels in accordance with the relationship.

10 Claims, 9 Drawing Sheets

(51) Int. Cl.
*H04N 5/369* (2011.01)
*H04N 9/04* (2006.01)
*H04N 101/00* (2006.01)

(56) References Cited

U.S. PATENT DOCUMENTS

| | | | | |
|---|---|---|---|---|
| 2011/0205423 A1* | 8/2011 | Tsukada | .......... | G02B 7/38 348/345 |
| 2011/0273602 A1* | 11/2011 | Takamiya | .......... | H04N 5/23212 348/302 |
| 2011/0273608 A1* | 11/2011 | Tsukada | .......... | G02B 7/36 348/345 |
| 2012/0262604 A1* | 10/2012 | Ishii | .......... | H04N 5/23212 348/231.99 |
| 2012/0300104 A1* | 11/2012 | Onuki | .......... | H04N 5/23212 348/302 |
| 2013/0155271 A1* | 6/2013 | Ishii | .......... | H04N 5/23212 348/222.1 |
| 2014/0211075 A1* | 7/2014 | Inoue | .......... | G02B 7/28 348/349 |
| 2014/0211076 A1* | 7/2014 | Inoue | .......... | G02B 7/34 348/349 |
| 2015/0215517 A1* | 7/2015 | Kusaka | .......... | G02B 7/282 348/353 |
| 2015/0244926 A1* | 8/2015 | Inoue | .......... | G02B 7/34 348/350 |

FOREIGN PATENT DOCUMENTS

| | | |
|---|---|---|
| JP | 2008177794 | 7/2008 |
| JP | 2010021649 | 1/2010 |
| JP | 2010-062640 A | 3/2010 |
| JP | 2010-140013 A | 6/2010 |
| JP | 2010-169709 A | 8/2010 |
| JP | 2012-175145 A | 9/2012 |
| JP | 5622975 B1 | 11/2014 |
| WO | 2014080674 A1 | 5/2014 |

OTHER PUBLICATIONS

International Preliminary Report on Patentability issued in corresponding International Patent Application No. PCT/JP2014/050157 on Jul. 14, 2015, consisting of 11 pp. (English translation provided).

International Search Report mailed in corresponding International Patent Application No. PCT/JP2014/050157 on Mar. 11, 2014, consisting of 5 pp. (English translation provided).

Office Action mailed in corresponding Japanese Patent Application No. 2014-517296 on Jun. 10, 2014, consisting of 6 pp. (English translation provided).

* cited by examiner

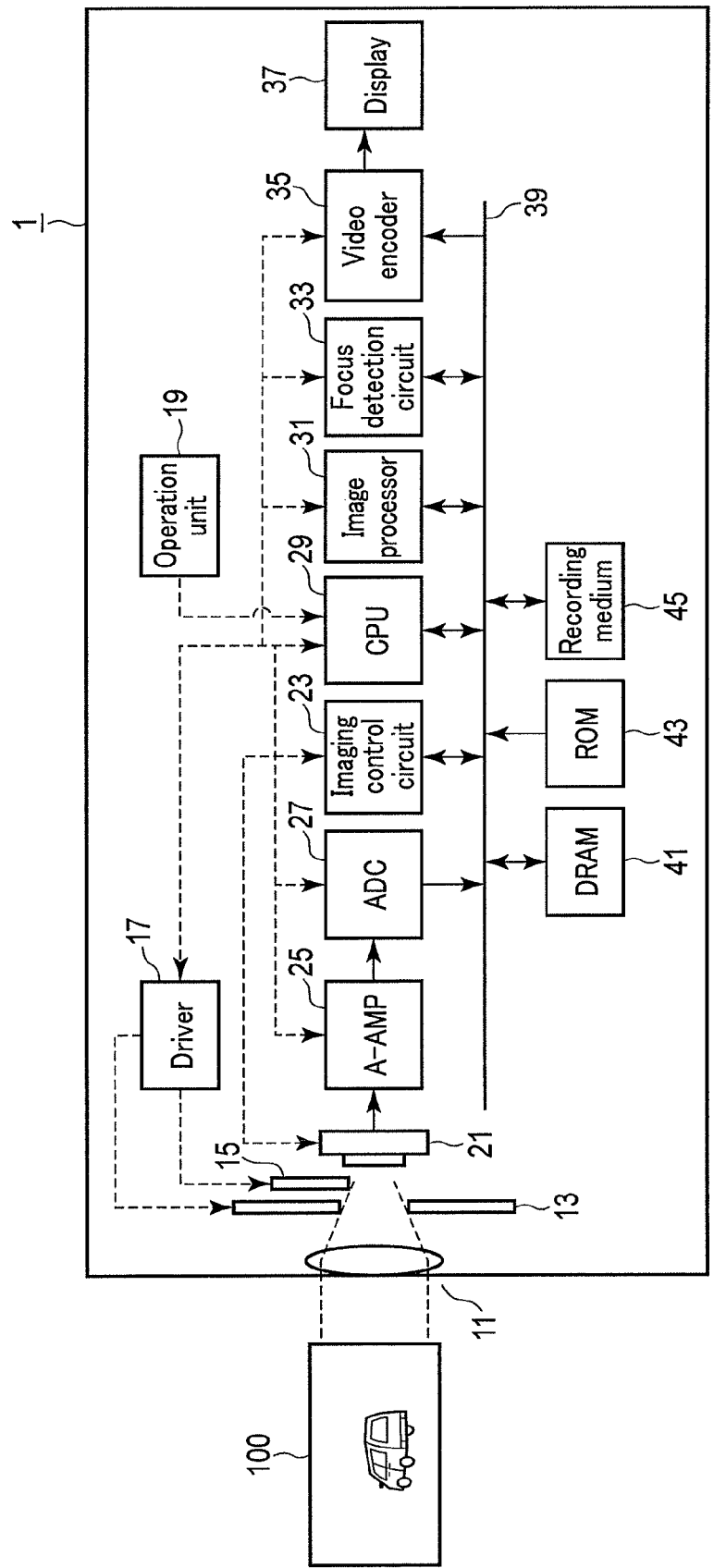
F I G. 1

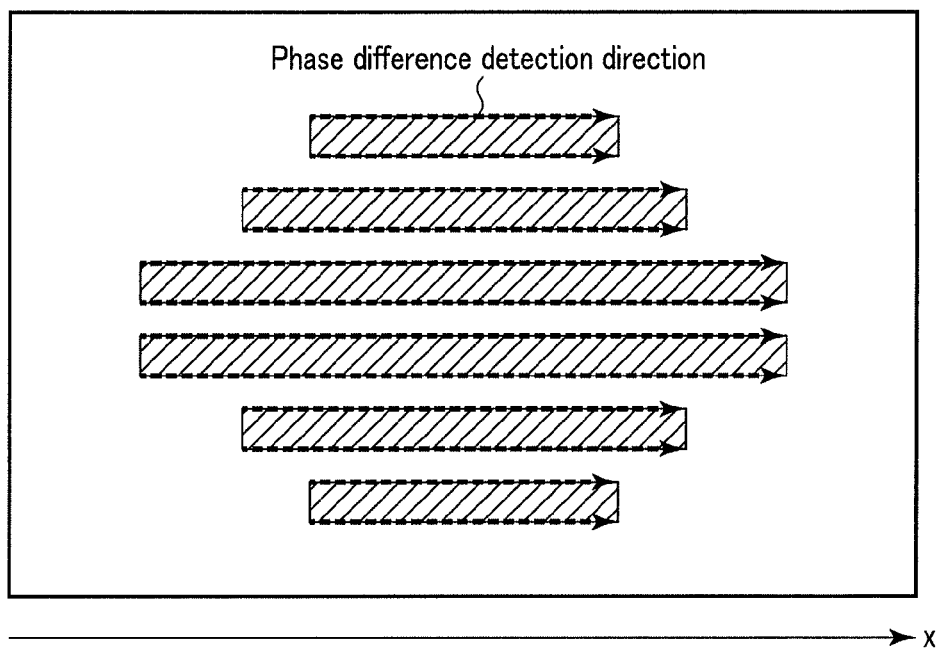
F I G. 7A
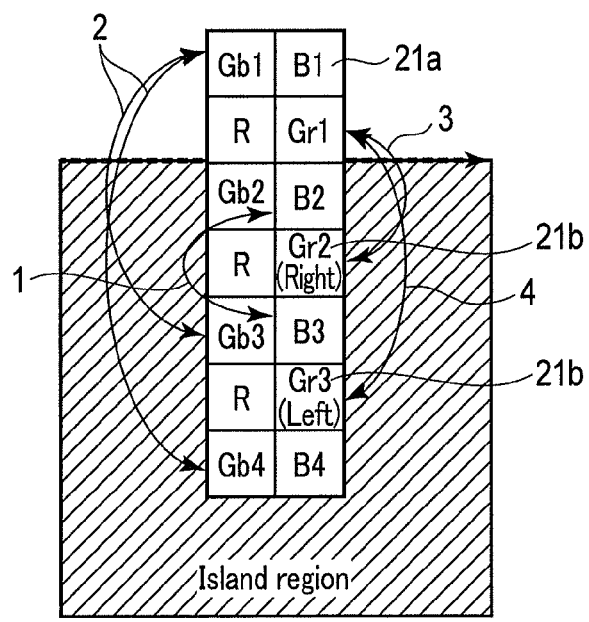
F I G. 7B

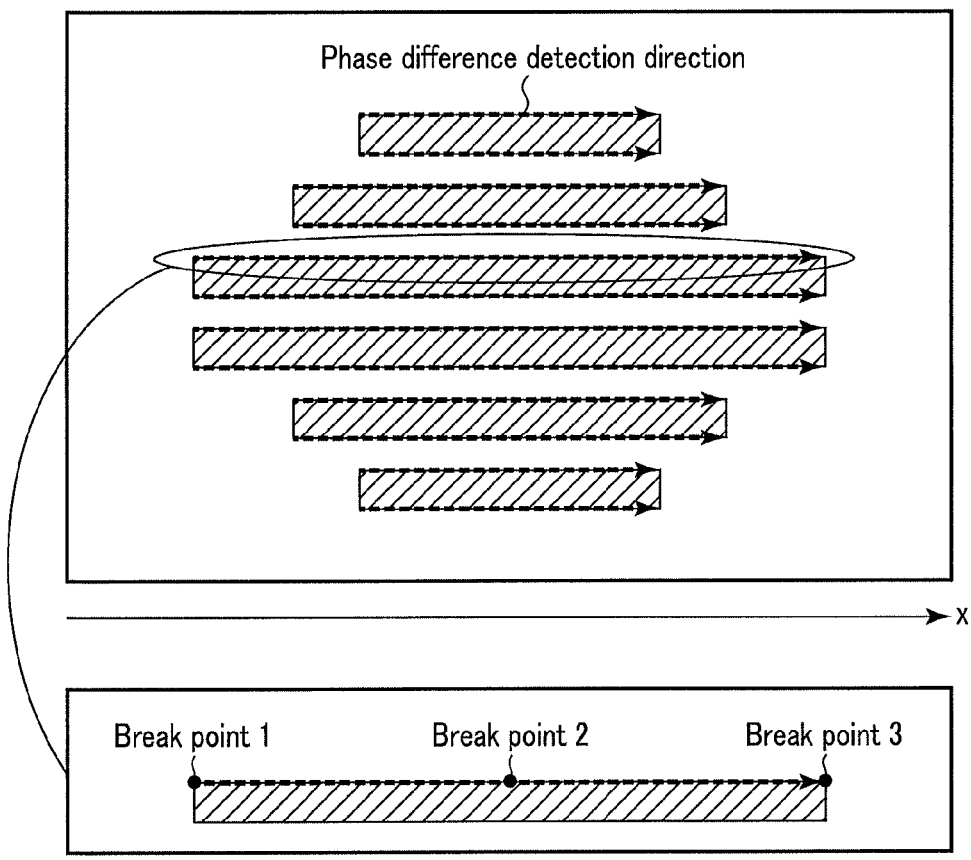
F I G. 9

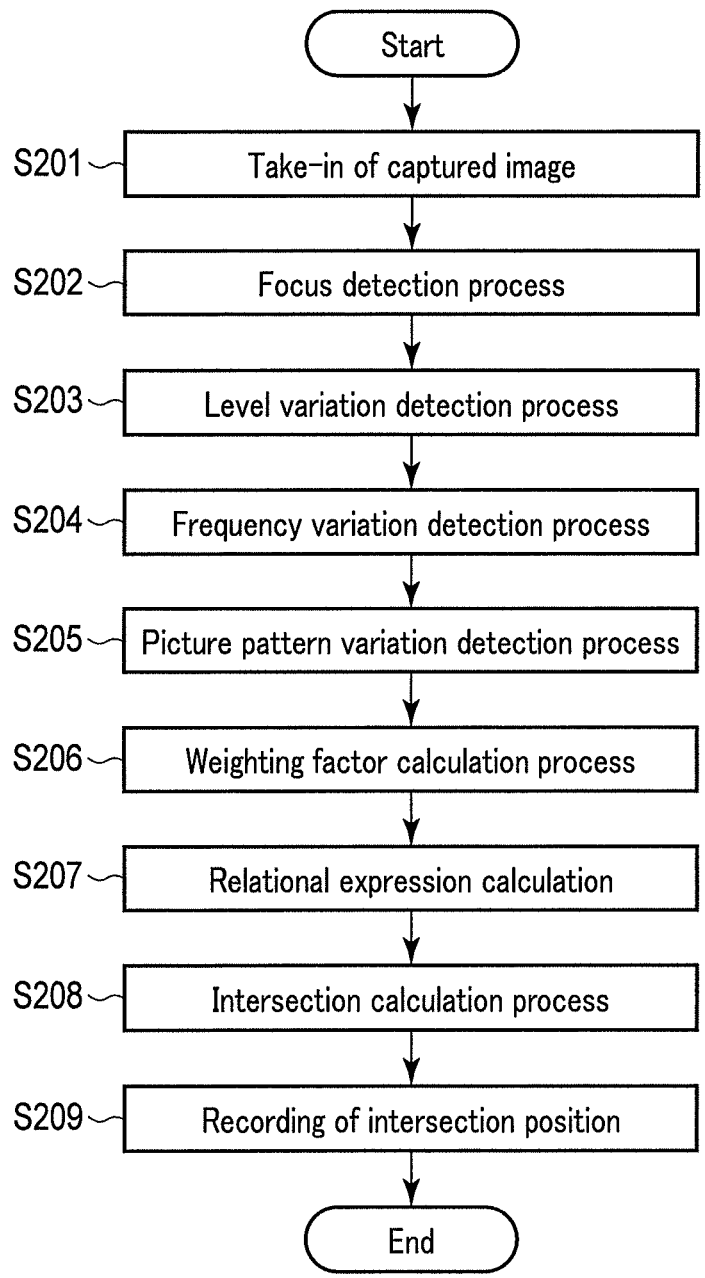
F I G. 10

IMAGING APPARATUS AND IMAGE CORRECTION METHOD, AND IMAGE PROCESSING APPARATUS AND IMAGE PROCESSING METHOD

CROSS-REFERENCE TO RELATED APPLICATIONS

This application is a Continuation Application of PCT Application No. PCT/JP2014/050157, filed Jan. 8, 2014 and based upon and claiming the benefit of priority from the prior Japanese Patent Application No. 2013-002480, filed Jan. 10, 2013, the entire contents of both of which are incorporated herein by reference.

BACKGROUND OF THE INVENTION

1. Field of the Invention

The present invention relates to an imaging apparatus which processes a pixel output of an image-capturing element configured to detect a focus state by utilizing some pixels as phase difference detection elements of a phase difference method, and an image correction method using the imaging apparatus, and to an image processing apparatus and an image processing method.

2. Description of the Related Art

A proposal relating to an imaging apparatus, which detects a focus state by utilizing some pixels of an image-capturing element as phase difference detection elements, is disclosed in, for example, Japanese Patent No. 3592147. In Japanese Patent No. 3592147, some pixels of the image-capturing element are set to be phase difference detection pixels, subject light fluxes passing through different pupil regions, which are symmetric with respect to an optical axis center of a photographing lens, are focused on a plurality of phase difference detection pixels, and a phase difference between the subject light fluxes is detected, thereby detecting a focus state of the photographing lens.

Here, for example, a partial area of the phase difference detection pixel is shielded so as to be able to receive either of the subject light fluxes passing through the different pupil regions of the photographing lens. Thus, the phase difference detection pixel becomes a defective pixel which cannot be used as an image as such. Thus, in an imaging apparatus disclosed in Jpn. Pat. Appln. KOKAI Publication No. 2010-062640, the pixel output of the phase difference detection pixel is made available for recording or display, by subjecting the pixel output to gain adjustment or by executing interpolation with use of peripheral pixels.

BRIEF SUMMARY OF THE INVENTION

According to a first aspect of the invention, there is provided an imaging apparatus comprising: an image-capturing element configured such that a phase difference detection pixel for detecting a focus is provided in a part of imaging pixels; an optical axis position estimation processor configured to estimate an optical axis position of an optical system configured to form an image of a subject on an image-capturing surface of the image-capturing element, from a pixel output of the phase difference detection pixel and a pixel output of the imaging pixel; and a pixel correction unit configured to correct pixel outputs of the respective phase difference detection pixels, wherein the optical axis position estimation processor includes: a relationship calculator configured to calculate a relationship between the pixel output of the phase difference detection pixel and an image height, from the pixel output of the phase difference detection pixel and a pixel output of an image pixel near the phase difference detection pixel; and an optical axis position calculator configured to calculate the optical axis position, from the relationship calculated with respect to each of a pair of the phase difference detection pixels arranged in a detection direction of a phase difference, and wherein the pixel correction unit corrects pixel outputs of the respective phase difference detection pixels in accordance with the relationship.

According to a second aspect of the invention, there is provided an imaging apparatus comprising: an image-capturing element configured such that a phase difference detection pixel for detecting a focus is provided in a part of imaging pixels; an optical axis position estimation processor configured to estimate an optical axis position of an optical system configured to form an image of a subject on an image-capturing surface of the image-capturing element, from a pixel output of the phase difference detection pixel and a pixel output of the imaging pixel; and a pixel correction unit configured to correct pixel outputs of the respective imaging pixels and outputs of the respective phase difference detection pixels in accordance with the relationship, wherein the optical axis position estimation processor includes: a relationship calculator configured to calculate a relationship between the pixel output of the phase difference detection pixel and an image height, from the pixel output of the phase difference detection pixel and a pixel output of an image pixel near the phase difference detection pixel; and an optical axis position calculator configured to calculate the optical axis position, from the relationship calculated with respect to each of a pair of the phase difference detection pixels arranged in a detection direction of a phase difference, and wherein the correcting unit corrects an influence of optical characteristics of the optical system upon the pixel outputs from the imaging pixel and the phase difference detection pixel, in accordance with the optical axis position calculated by the optical axis position calculator.

According to a third aspect of the invention, there is provided an image correction method comprising: calculating a relationship between a pixel output of a phase difference detection pixel of an image-capturing element and an image height, from the pixel output of the phase difference detection pixel and a pixel output of an image pixel near the phase difference detection pixel, the image-capturing element being configured such that the phase difference detection pixel, which is configured to detect a focus, is provided in a part of the imaging pixels; calculating an optical axis position of an optical system, from the relationship calculated with respect to each of a pair of the phase difference detection pixels arranged in a detection direction of a phase difference; storing the calculated optical axis position in a storage unit; and correcting an influence of optical characteristics of the Optical system upon the pixel outputs from the imaging pixel and the phase difference detection pixel, in accordance with information of the optical axis position stored in the storage unit.

According to a fourth aspect of the invention, there is provided an image processing apparatus which processes a pixel output from an image-capturing element including a phase difference detection pixel and an imaging pixel which are arranged in a detection direction of a phase difference between images obtained by dividing a pupil, the apparatus comprising: a first pixel output variation detector configured to detect a variation of a pixel output of the phase difference detection pixel and a pixel output of the imaging pixel which has the same color as the phase difference detection pixel and is located in a direction different from the detection direction of the phase difference by the phase difference detection pixel; a second pixel output variation detector configured to detect a variation of pixel outputs between a plurality of imaging pixels which are located near the phase difference detection pixel and the imaging pixel, which were used by the first pixel output variation detector in order to detect the variation of the pixel outputs; and a pixel correction unit configured to correct pixel outputs of the respective phase difference detection pixels, from results of the first pixel output variation detector and the second pixel output variation detector.

According to a fifth aspect of the invention, there is provided an image processing method for processing a pixel output from an image-capturing element including a phase difference detection pixel and an imaging pixel which are arranged in a detection direction of a phase difference, the method comprising: detecting, by a first pixel output variation detector, a variation of a pixel output of the phase difference detection pixel and a pixel output of the imaging pixel which has the same color as the phase difference detection pixel and is located in a direction different from the detection direction of the phase difference by the phase difference detection pixel; detecting, by a second pixel output variation detector, a variation of pixel outputs between a plurality of imaging pixels which are located near the phase difference detection pixel and the imaging pixel, which were used by the first pixel output variation detector in order to detect the variation of the pixel outputs; and correcting, by a pixel correction unit, pixel outputs of the respective phase difference detection pixels, from results of the first pixel output variation detector and the second pixel output variation detector.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute apart of the specification, illustrate embodiments of the invention, and together with the general description given above and the detailed description of the embodiments given below, serve to explain the principles of the invention.

FIG. 1 is a block diagram illustrating a configuration of a digital camera which is an example of an imaging apparatus according to an embodiment of the present invention.

FIG. 7A is a first view for describing a level variation detection process, a frequency variation detection process, and a picture pattern variation detection process.

FIG. 7B is a second view for describing the level variation detection process, frequency variation detection process, and picture pattern variation detection process.

FIG. 9 is a view for describing a relational expression calculation process of Modification 2.

FIG. 10 is a flowchart in a case of estimating an optical axis position at a time of adjustment.

DETAILED DESCRIPTION OF THE INVENTION

Figure 2:
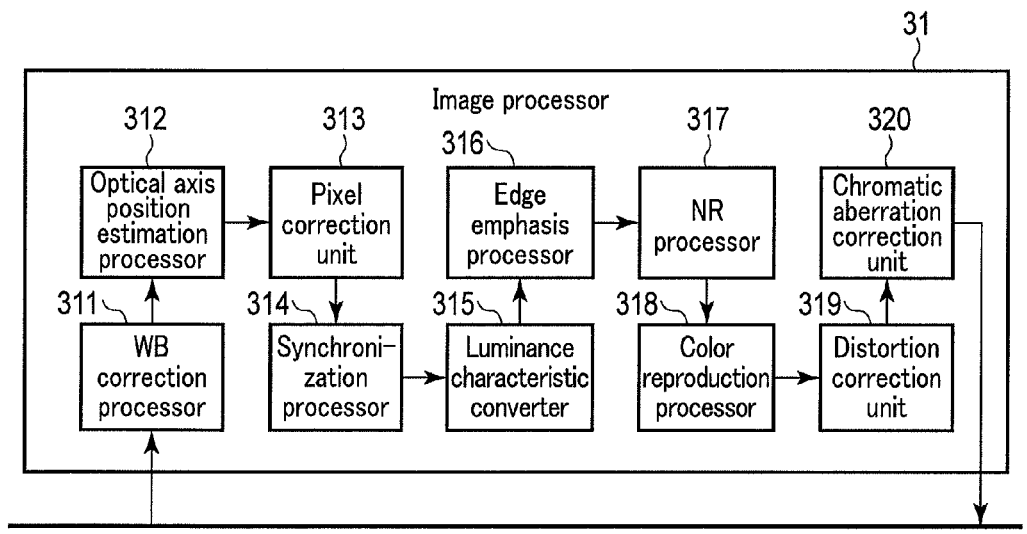
FIG. 2 is a view illustrating a detailed configuration of an image processor.

Embodiments of the present invention will be described hereinafter with reference to the accompanying drawings.

FIG. 1 is a block diagram illustrating a configuration of a digital camera (hereinafter, simply referred to as "camera") which is an example of an imaging apparatus according to an embodiment of the present invention. Here, in FIG. 1, a solid line with an arrow indicates the flow of data, and a broken line with an arrow indicates the flow of a control signal.

The camera 1 illustrated in FIG. 1 includes a photographing lens 11, a diaphragm 13, a mechanical shutter 15, a driver 17, an operation unit 19, an image-capturing element 21, an imaging control circuit 23, an A-AMP 25, an analog-to-digital converter (ADC) 27, a CPU (Central Processing Unit) 29, an image processor 31, a focus detection circuit 33, a video encoder 35, a display 37, a bus 39, a DRAM (Dynamic Random Access Memory) 41, a ROM (Read Only Memory) 43, and a recording medium 45.

The photographing lens 11 is an optical system composed of a single lens or plural lenses for forming an image from a subject 100 onto the image-capturing element 21. The photographing lens 11 may be a fixed focal length lens or a zoom lens.

The diaphragm 13 is disposed on the optical axis of the photographing lens 11, and is configured such that the aperture thereof is variable. The diaphragm 13 restricts the amount of a light flux from the subject 100 which has passed through the photographing lens 11. The mechanical shutter 15 is disposed behind the diaphragm 13, and is configured to be freely openable/closable. The mechanical shutter 15 adjusts, by adjusting the time of opening thereof, the time of incidence of the subject light flux from the subject. 100 onto the image-capturing element 21 (i.e. the exposure time of the image-capturing element 21). As the mechanical shutter 15, a publicly known focal plane shutter, a lens shutter, or the like may be adopted. The driver 17 executes, based on control signals from the CPU 29, focus adjustment of photographing lens 11, an aperture size control of the diaphragm 13 and an opening/closing control of the mechanical shutter.

The operation unit 19 includes various operation buttons, such as a power button, a release button, a playback button and a menu button, and various operation members such as a touch panel. The operation unit 19 detects operation states of the various operation members, and outputs signals indicative of detection results to the CPU 29. By the operation unit 19 of the present embodiment, the photography mode of the camera 1 can be selected. By operating a photography mode dial serving as an operation member included in the operation unit 19, a user can select the photography mode of the camera 1 from between a still image photography mode and a moving picture photography mode. The still image photography mode is a photography mode for capturing a still image, and the moving picture photography mode is a photography mode for capturing a moving picture. Although the example of selection by the dial is illustrated here, the photography mode may be selected on, for example, a menu screen by operating, for example, a touch panel.

The image-capturing element 21 is disposed on the optical axis of the photographing lens 11, and behind the mechanical shutter 15 at a position where an image of the subject light flux is formed by the photographing lens 11. The image-capturing element 21 is configured such that photodiodes, which constitute pixels, are two-dimensionally arranged. The photodiodes, which constitute the image-capturing element 21, generate an electric charge corresponding to a received light amount. The charge generated by the photodiodes is accumulated in capacitors which are connected to the respective photodiodes. The charge accumulated in the capacitors is read out as an image signal. In addition, in front of the photodiodes constituting the pixels, a color filter of, for example, a Bayer arrangement is disposed. The Bayer arrangement includes lines in which R pixels and G (Gr) pixels are alternately arranged in the horizontal direction, and lines in which G (Gb) pixels and B pixels are alternately arranged in the horizontal direction. The image-capturing element 21 in this embodiment includes a plurality of different charge read-out methods. The charge accumulated in the image-capturing element 21 is read out in accordance with a control signal from the imaging control circuit 23. The image-capturing element 21 in this embodiment includes imaging pixels for acquiring an image for recording or display, and phase difference detection pixels for making focus detection. The pixels that are used as the phase difference detection pixels shield partial regions thereof, unlike the other pixels. The details of the image-capturing element 21 will be described later in detail.

The imaging control circuit 23 sets the read-out method of the image-capturing element 21 in accordance with a control signal from the CPU 29, and controls the read-out of an image signal from the image-capturing element 21 in accordance with the set read-out method. The read-out method of pixel data from the image-capturing element 21 is set in accordance with the operation state of the camera 1. For example, when a real-time property is required for pixel data read-out from the image-capturing element 21 (e.g. at a time of live view display or at a time of recording a moving picture), pixel data from a plurality of same-color pixels are mixedly read out, or pixel data of specific pixels are read out while being thinned out, so that the read-out of pixel data can be executed at high speed. On the other hand, when image quality, rather than the read-time property, is required (e.g. at a time of recording a still image), the resolution is maintained by reading out pixel data of all pixels, without executing mixed read-out or thinned-out read-out.

The A-AMP 25 executes analog gain adjustment of an image signal which is read out of the image-capturing element 21. The ADC 27 is an analog-to-digital converter, and converts the image signal, which was subjected to analog gain adjustment by the A-AMP 25, to a digital-format image signal (pixel data). Hereinafter, in the present specification, a set of a plurality of image data is referred to as "imaging data".

The CPU 29 executes overall control of the camera 1 in accordance with a program stored in the ROM 43, which will be described later.

The image processor 31 executes various image processes on the imaging data, and generates image data. For example, at a time of recording a still image, the image processor 31 executes an image process for still image recording, and generates still image data. Similarly, at a time of recording a moving picture, the image processor 31 executes an image process for moving picture recording, and generates moving picture data. Furthermore, at a time of live view display, the image processor 31 executes an image process for display, and generates image data for display. The detailed configuration of the image processor 31 will be specifically described later.

The focus detection circuit 33 acquires pixel data from the phase difference detection pixels, and calculates, based on the acquired pixel data, a defocus direction and a defocus amount relative to an in-focus position of the photographing lens 11, by using a publicly known phase difference method.

The video encoder 35 reads out image data for display, which was generated by the image processor 31 and temporarily stored in the DRAM 41, and outputs the read-out image data for display to the display 37.

The display 37 is a display such as a liquid crystal display or an organic EL display, and is disposed, for example, on the back surface of the camera 1. This display 37 displays an image in accordance with the image data for display, which was input from the video encoder 35. The display 37 is used for, for example, live view display, or display of an already recorded image.

The bus 39 is connected to the ADC 27, CPU 29, image processor 31, focus detection circuit 33, video encoder 35, DRAM 41, ROM 43 and recording medium 45, and various data generated by these blocks are transferred.

The DRAM 41 is an electrically rewritable memory, and temporarily stores various data such as the above-described imaging data (pixel data), image data for recording, image data for display, and process data in the CPU 29. Incidentally, an SDRAM (Synchronous Dynamic Random Access Memory) may be used as a memory for temporary storage.

The ROM 43, which functions as an example of a storage unit, is a nonvolatile memory such as a mask ROM or a flash memory. The ROM 43 stores programs which are used in the CPU 29, and various data such as adjustment values of the camera 1.

The recording medium 45 is configured to be built in the camera 1 or to be freely detachable, and records image data for recording as an image file of a predetermined format.

FIG. 2 is a view illustrating a detailed configuration of the image processor 31. In FIG. 2, the depiction of the blocks, other than the image processor 31, is omitted.

The image processor 31 includes a white balance (WB) correction processor 311, an optical axis position estimation processor 312, a pixel correction unit 313, a synchronization processor 314, a luminance characteristic converter 315, an edge emphasis processor 316, a noise reduction (NR) processor 317, a color reproduction processor 318, a distortion correction unit 319, and a chromatic aberration correction unit 320. In addition, although illustration is omitted, the image processor 31 includes a compression/decompression processor, etc.

The WB correction processor 311 corrects a color balance of an image, by amplifying each color component of imaging data by a predetermined gain amount.

The optical axis position estimation processor 312 estimates an optical axis position (reference position of image height) of the photographing lens 11 on an image-capturing surface of the image-capturing element 21, from a pixel output of an imaging pixel in the imaging data and a pixel output of a phase difference detection pixel. The pixel correction unit 313 corrects the pixel output of the phase difference detection pixels in accordance with the estimation result of the optical axis position estimation processor 312. The details of the optical axis position estimation processor 312 and pixel correction unit 313 will be described later.

The synchronization processor 314 converts imaging data in which one pixel corresponds to one color component, for instance, imaging data that is output via the image-capturing element 21 in accordance with the Bayer arrangement, to image data in which one pixel corresponds to a plurality of color components.

The luminance characteristic converter 315 converts the luminance characteristic of the image data, which was generated by the synchronization processor 314, to a luminance characteristic that is suited to display or recording.

The edge emphasis processor 316 multiplies an edge signal, which was extracted from the image data by using a bandpass filter or the like, by an edge emphasis coefficient, and adds this result to the original image data, thereby emphasizing an edge (contour) component in the image data.

The NR processor 317 removes a noise component in the image data by using a coring process or the like.

The color reproduction processor 318 executes various processes for making proper the color reproduction of an image. An example of this process is a color matrix arithmetic process. This color matrix arithmetic process is a process of multiplying image data by a color matrix coefficient corresponding to, for example, a white balance mode. Besides, the color reproduction processor 318 executes correction of saturation/hue.

The distortion correction unit 319 corrects distortion in the image data. For example, the distortion correction unit 319 executes coordinate conversion of image data prior to distortion correction in accordance with a predetermined function for correction of distortion aberration, thereby correcting distortion aberration in the image data. The distortion correction unit 319 calculates such a coordinate conversion function that the position of the optical axis estimated in the optical axis position estimation processor 312 becomes the center.

The chromatic aberration correction unit 320, which, together with the distortion correction unit 319, functions as an example of an optical characteristic correction unit, corrects chromatic aberration in the image data. For example, the chromatic aberration correction unit 320 corrects chromatic aberration in the image data by executing such a coordinate conversion as to make coincident the positions of the image data of R, G and B prior to chromatic aberration correction in accordance with a predetermined function for correcting chromatic aberration. The chromatic aberration correction unit 320 aligns the image data of R, G and B such that the position of the optical axis estimated in the optical axis position estimation processor 312 becomes the center of each image data.

Figure 3:
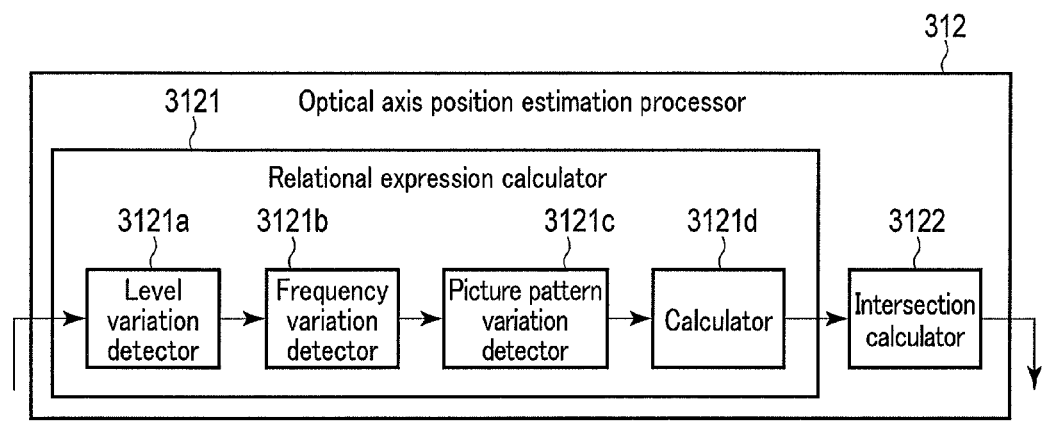
FIG. 3 is a view illustrating a detailed configuration of an optical axis position estimation processor.

FIG. 3 is a view illustrating a detailed configuration of the optical axis position estimation processor 312. The optical axis position estimation processor 312 includes a relational expression calculator 3121 and an intersection calculator 3122.

The relational expression calculator 3121 calculates relational expressions representing the relationship between the pixel output of the phase difference detection pixel and the image height. The relational expression calculator 3121 includes a level variation detector 3121a, a frequency variation detector 3121b, a picture pattern variation detector 3121c, and a calculator 3121d.

The level variation detector 3121a detects a variation of pixel outputs between a phase difference detection pixel and an imaging pixel near the phase difference detection pixel. The variation of pixel outputs is the ratio between the values of pixel data or the difference between the values of pixel data. The frequency variation detector 3121b detects, with respect to each phase difference detection pixel, a variation of pixel outputs of a plurality of imaging pixels which are located in a direction different from the direction of phase difference detection of each phase difference detection pixel. The picture pattern variation detector 3121c detects a variation of pixel outputs between imaging pixels which are located near the phase difference detection pixel and its nearby imaging pixel, the level variation of which was detected. The calculator 3121d calculates a relational expression indicative of the relationship between the pixel output of the phase difference detection pixel and the image height, by using the detection result of the level variation detector 3121a, the detection result of the frequency variation detector 3121b, and the detection result of the picture pattern variation detector 3121c. The level variation detector 3121a, frequency variation detector 3121b, picture pattern variation detector 3121c and calculator 3121d will be described later in detail.

The intersection calculator 3122 calculates an intersection of the relational expressions, which were calculated by the relational expression calculator 3121 in connection with the two kinds of phase difference detection pixels, respectively, as the position of the optical axis of the photographing lens 11.

Figure 4:
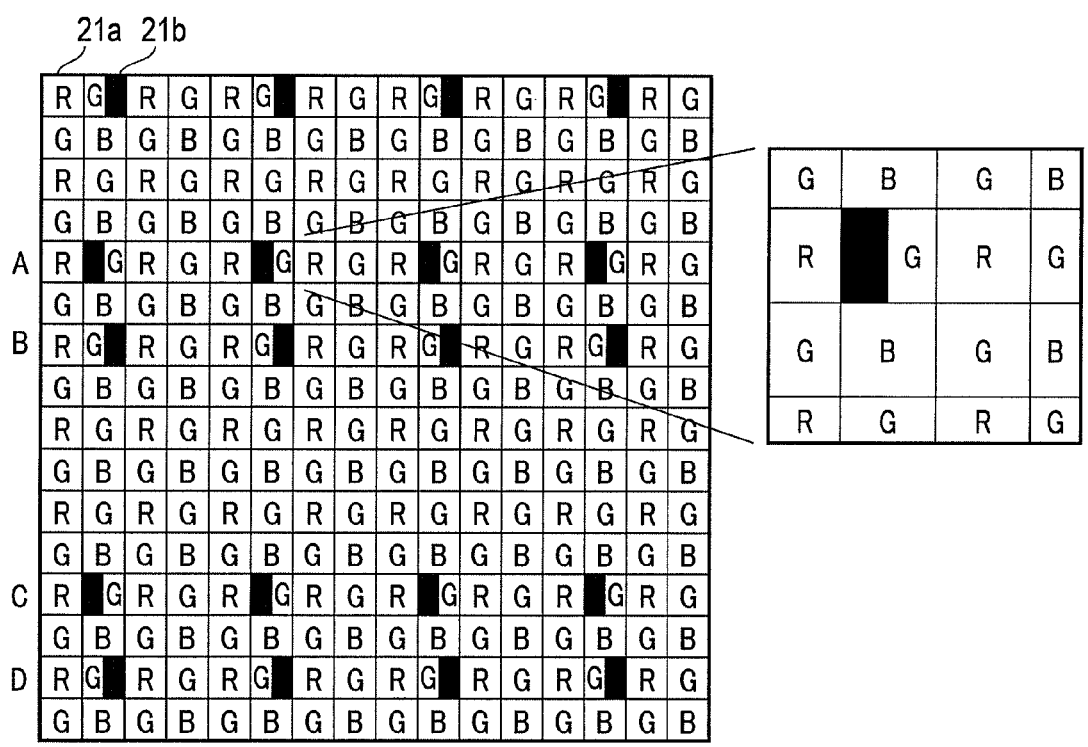
FIG. 4 is a view illustrating a pixel arrangement of an image-capturing element.

Referring to FIG. 4, the configuration of the image-capturing element 21 is described. FIG. 4 is a view illustrating a pixel arrangement of the image-capturing element 21. In addition, a right part of FIG. 4 illustrates, in enlarged scale, some pixels. Although FIG. 4 illustrates an example of a Bayer arrangement, the arrangement of the color filter is not limited to the Bayer arrangement, and various arrangements may be adopted.

As described above, the image-capturing element 21 of the Bayer arrangement includes lines in which R pixels and G (Gr) pixels are alternately arranged in the horizontal direction and lines in which G (Gb) pixels and B pixels are alternately arranged in the horizontal direction. In other words, in the image-capturing element 21 of the Bayer arrangement, a set of four pixels, namely a Gr pixel, an R pixel, a Gb pixel and a B pixel, which are illustrated in a right-side enlarged view, is repeatedly arranged in the horizontal and vertical directions.

In the present embodiment, phase difference detection pixels 21b are disposed at positions of a part of imaging pixels 21a. The phase difference detection pixel 21b is a pixel in which, for example, either a left region or a right region is shielded by a light shield film. In the example of FIG. 4, a row of a phase difference detection pixel with a left half surface shielded (hereinafter referred to as "right opening phase difference detection pixel") and a row of a phase difference detection pixel with a right half surface shielded (hereinafter referred to as "left opening phase difference detection pixel") are disposed close to each other in the vertical direction.

In the case of an image-capturing element with a large number of pixels, the area of each pixel decreases. Thus, it can be thought that a substantially identical image is formed on pixels which are disposed close to each other. Accordingly, by disposing the phase difference detection pixels as illustrated in FIG. 4, a phase difference can be detected by a pair of a phase difference detection pixel of a row A in FIG. 4 and a phase difference detection pixel of a row B. In addition, a phase difference can also be detected by a pair of a phase difference detection pixel of a row C in FIG. 4 and a phase difference detection pixel of a row D.

In the example of FIG. 4, that region of the phase difference detection pixel, which is shielded, is set to be either the left region or right region. In this case, a horizontal phase difference can be detected. On the other hand, by setting the region that is shielded to be either an upper or lower region, or to be a region in an oblique direction, a vertical phase difference or a phase difference in an oblique direction can also be detected. Besides, the light shield area may not be ½ of the pixel region, if the region that is shielded has a certain area. Furthermore, in FIG. 4, the phase difference detection pixel is disposed at the G pixel, but the phase difference detection pixel may be disposed at the R pixel or B pixel, other than the G pixel.

Additionally, in the example of FIG. 4, pupil division is implemented by shielding a partial region of the phase difference detection pixel. However, it should suffice if the phase difference detection pixel can selectively receive either of a pair of light fluxes which have passed through different pupil regions of the photographing lens 11. Thus, pupil division may be implemented by, for example, a microlens for pupil division, without adopting the configuration in which a partial region is shielded.

Figure 5A:
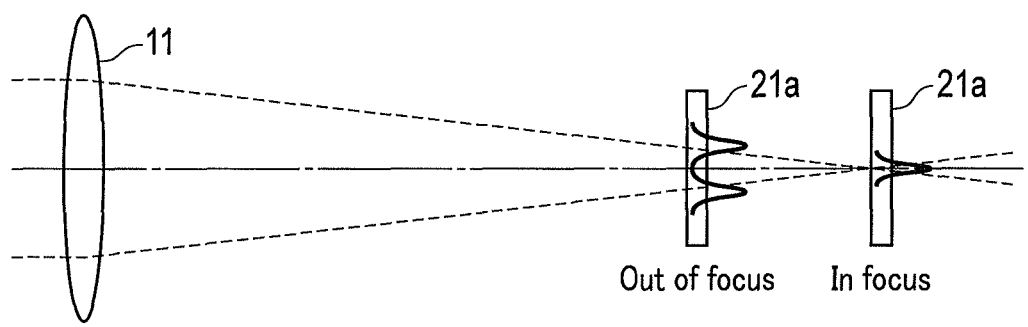
FIG. 5A is a view illustrating a focus state of an image on an imaging pixel.
Figure 5B:
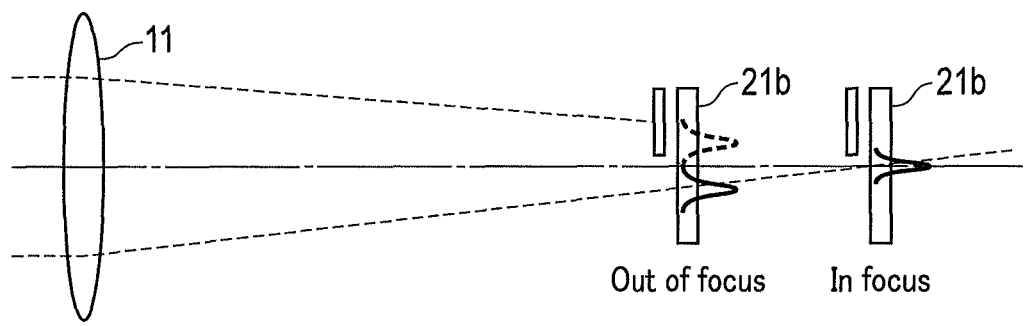
FIG. 5B is a view illustrating a focus state of an image on a phase difference detection pixel.

Referring to FIG. 5A and FIG. 5B, a description is given of the principle of focus detection by the phase difference method using the image-capturing element as illustrated in FIG. 4. Here, FIG. 5A illustrates a focus state of an image on the imaging pixel 21a. In addition, FIG. 5B illustrated a focus state of an image on the phase difference detection pixel 21b.

If it is assumed that the subject is a point light source, when the photographing lens 11 is in an in-focus state, a pair of subject light fluxes, which have been emitted from the subject and have passed through different pupil regions which are symmetric with respect to the optical axis center of the photographing lens 11, form an image at an identical position on the image-capturing element 21. On the other hand, when the photographing lens 11 is in an out-of-focus state, a pair of subject light fluxes, which have been emitted from the subject and have passed through the different pupil regions, form images at different positions on the image-capturing element 21. In other words, a phase difference occurs between the images formed by these paired subject light fluxes. By detecting this phase difference from the correlation of images which are detected by the right opening phase difference detection pixel and the left opening phase difference detection pixel, a defocus amount and a defocus direction of the photographing lens 11 are detected.

Since a partial region of the phase difference detection pixel 21b is shielded, a decrease in light amount occurs. This decrease in light amount varies depending on the position of the light shield film, the angle of incident light on the phase difference detection pixel 21b, and the image height, as well as the area of the light shield film formed on the phase difference detection pixel 21b. The decrease in light amount is corrected by a pixel output correction process which will be described later.

Figure 6:
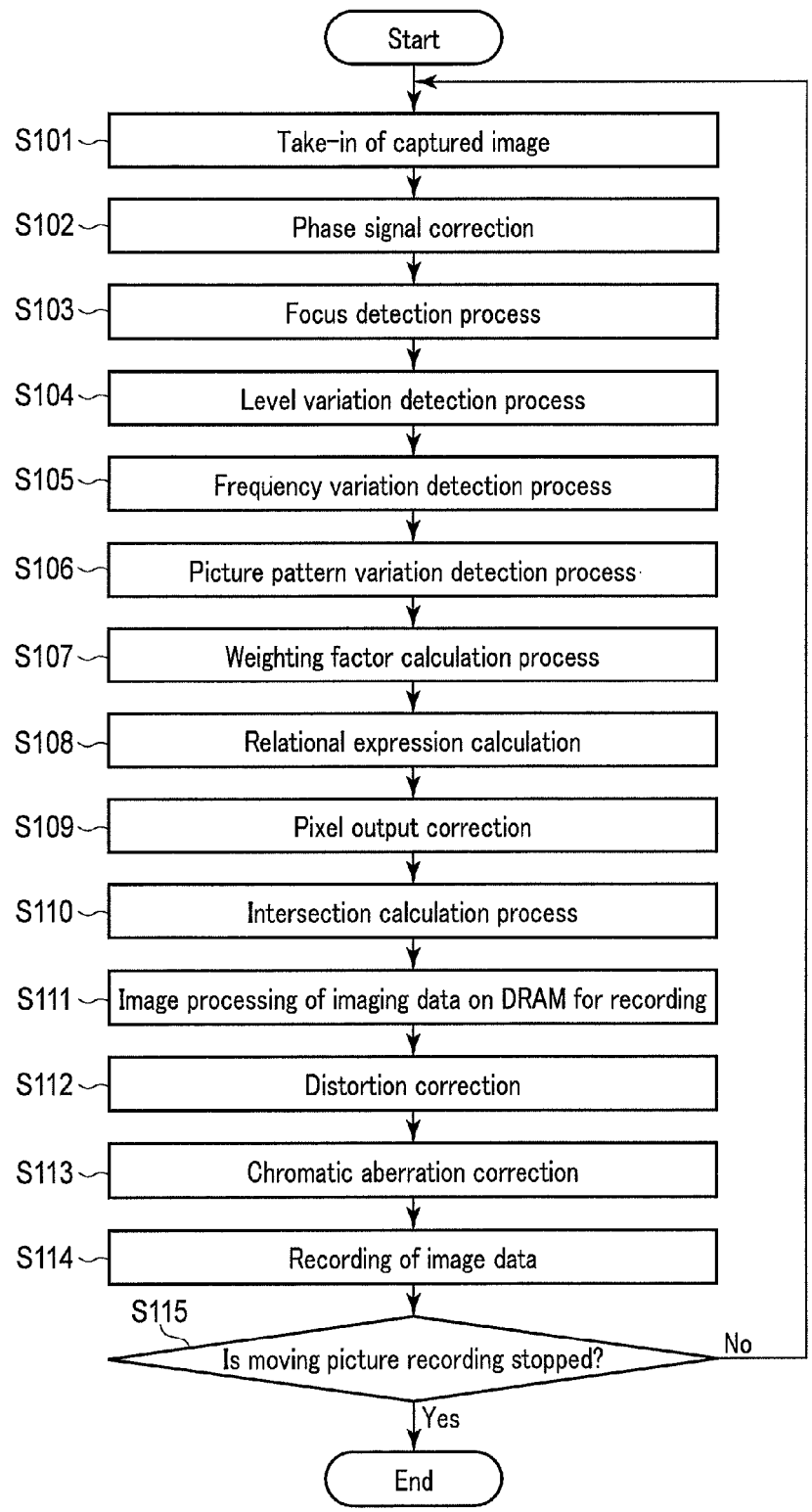
FIG. 6 is a flowchart illustrating a process of a moving picture recording operation in the imaging apparatus.

Hereinafter, a concrete operation of the imaging apparatus of the present embodiment is described. FIG. 6 is a flowchart illustrating a process of a moving picture recording (moving picture photography) operation in the imaging apparatus. The moving picture recording operation is started, for example, when the release button was depressed during the moving picture photography mode. In addition, the CPU 29 executes the process of the flowchart of FIG. 6 in accordance with the program stored in the ROM 43. Incidentally, although FIG. 6 illustrates the moving picture recording operation, the image processing method according to the embodiment is also applicable to the still image recording operation.

If the operation of the flowchart of FIG. 6 is started, the CPU 29 starts take-in of imaging data (step S101). Here, the CPU 29 inputs setup data, which corresponds to the current operation mode, to the imaging control circuit 23. In accordance with this setup data, the imaging control circuit 23 controls read-out of pixel data from the image-capturing element 21. If the read-out method is set in the imaging control circuit 23, an image signal in a state in which pixel mixing or pixel thinning-out was made is read out from the image-capturing element 21 in accordance with the read-out method that was set in the imaging control circuit 23. The image signal, which was read out from the image-capturing element 21, is digitized by the ADC 27, and is temporarily stored in the DRAM 41 as imaging data.

Next, the CPU 29 corrects the pixel output (phase signal) of the phase difference detection pixel (step S102). In this phase signal correction process, the pixel output of the phase difference detection pixel is corrected by utilizing the result of a relational expression calculation process which was executed in the previous frame. This correction is executed in the same manner as a pixel output correction process in step S109 which will be described later. The details thereof will be described later.

Next, the CPU 29 executes a focus detection process (step S103). The CPU 29 causes the focus detection circuit 33 to execute the focus detection process. Upon receiving an execution instruction of the focus detection process, the focus detection circuit 33 reads out pixel data, which corresponds to the phase difference detection pixel, from the imaging data that is temporarily stored in the DRAM 41, and calculates the defocus direction and defocus amount of the photographing lens 11 by a publicly known phase difference method by using this pixel data as a phase signal. Next, the CPU 29 controls the driver 17, based on the defocus direction and defocus amount of the photographing lens 11 which were detected by the focus detection circuit 33, and sets the photographing lens 11 in focus.

Next, the CPU 29 inputs the imaging data to the image processor 31. Upon receiving this, the optical axis position estimation processor 312 executes an estimation process of the optical axis position. As this process, the level variation detector 3121a of the optical axis position estimation processor 312 executes a level variation detection process on the imaging data (step S104). Actually, in the case of the image processor 31 illustrated in FIG. 2, a WB correction process by the WB correction processor 311 is executed prior to the level variation detection process, although illustration thereof is omitted in FIG. 6. Incidentally, the WB correction process may be executed after a pixel output correction process which will be described later.

Since a partial region of the phase difference detection pixel is light-shielded, the above-described decrease in light amount occurs. The level variation detection process is a process of detecting a decrease amount (level variation) of the light amount in the phase difference detection pixel, by detecting a variation of a pixel output of the phase difference detection pixel and a pixel output of its nearby imaging pixel of the same color (the ratio or difference between the values of pixel data). In the present embodiment, the ratio or difference of values of pixel data between the phase difference detection pixel and an imaging pixel in a direction different from the detection direction of the phase difference, among the nearby imaging pixels of the same color, is detected.

A description is now given of the level variation detection process in the case in which the phase difference detection pixels are disposed in the horizontal direction of the image-capturing element 21, for example, as illustrated in FIG. 7A. The phase difference detection pixels 21b are disposed in hatched regions (hereinafter referred to as "island regions") in FIG. 7A. An n-number of pairs of right opening phase difference detection pixels and left opening phase difference detection pixels are disposed in each island region. In the description below, it is assumed that the right opening phase difference detection pixels and left opening phase difference detection pixels are disposed at Gr pixels, like the case of FIG. 4. In addition, as illustrated in FIG. 7A, the horizontal direction of the image-capturing element 21 is defined as an x-axis. A starting x coordinate in the horizontal direction of the phase difference detection pixel in each island region is defined as "start_x". The start_x is defined for each of the right opening phase difference detection pixel and the left opening phase difference detection pixel.

FIG. 7B is an enlarged view of pixels in the island region of FIG. 7A. For example, it is assumed that the level variation detection process is executed on a right opening phase difference detection pixel Gr2 and a left opening phase difference detection pixel Gr3, among the pixels illustrated in FIG. 7B. At this time, a ratio or a difference between the values of pixel data is detected with reference to a nearby imaging pixel of the same color in a direction different from the horizontal direction that is the phase difference detection direction by the right opening phase difference detection pixel Gr2 and left opening phase difference detection pixel Gr3, i.e. in the vertical direction relative to the right opening phase difference detection pixel Gr2 and left opening phase difference detection pixel Gr3. Accordingly, as regards the right opening phase difference detection pixel Gr2, the ratio in pixel output between the right opening phase difference detection pixel Gr2 and a nearby imaging pixel Gr1 of the same column is detected, as indicated by an arrow 3 in FIG. 7B. As regards the left opening phase difference detection pixel Gr3, the ratio or difference of values of pixel data between the left opening phase difference detection pixel Gr3 and the nearby imaging pixel Gr1 of the same column is detected, as indicated by an arrow 4 in FIG. 7B.

By this level variation detection process, it is possible to detect the decrease amount in light amount of the phase difference detection pixel relative to the imaging pixel, taking into account the influences of the area of the light shield film formed on each phase difference detection pixel, the position of the light shield film, the angle of incident light on the phase difference detection pixel, and the image height. However, it is possible that the decrease amount in light amount, which is detected by the level variation detection process, includes a decrease amount in light amount due to a variation of an image (picture pattern) itself. The reason for this is that, even on a nearby imaging pixel of a phase difference detection pixel, the same image is not necessarily formed. Thus, in the level variation detection process, it is desirable to detect a level variation between a phase difference detection pixel and an imaging pixel which is as close as possible to, and has the same color as, the phase difference detection pixel.

In addition, in the above-described example, a level variation between the phase difference detection pixel and the imaging pixel of the same column is detected. This aims at observing the tendency of a level variation in relation to an image height, which results from the difference in incidence angle of light to the phase difference detection pixel, this difference occurring due to characteristics such as optical axis misalignment of the photographing lens 11.

After the level variation detection process, the frequency variation detector 3121b executes a frequency variation detection process (step S105). The frequency variation detection process is a process of detecting the tendency of a variation in spatial frequency in the vicinity of the phase difference detection pixel. Here, in the present embodiment, the tendency of a variation in spatial frequency in a direction different from the detection direction of the phase difference is detected.

As a concrete process of the frequency variation detection process, the ratio or difference between the values of pixel data of a plurality of pixels having an identical spatial frequency in the phase detection direction, among the pixels around the phase difference detection pixel, is detected. In the case of the example of FIG. 7B, the pixels of the same column in the vertical direction in relation to the phase difference detection pixel have the same spatial frequency in the horizontal direction that is the detection direction of phase difference. Accordingly, as regards the right opening phase difference detection pixel Gr2, the ratio or difference of the values of pixel data between an imaging pixel B2 and an imaging pixel B3, which are disposed in a manner to sandwich the phase difference detection pixel Gr2, is detected, as indicated by an arrow 1 in FIG. 7B. In addition, as regards the left opening phase difference detection pixel Gr3, although not illustrated, the ratio or difference of the values of pixel data between the imaging pixel B3 and an imaging pixel B4, which are disposed in a manner to sandwich the phase difference detection pixel Gr3, is detected.

By this frequency variation detection process, the variation of the spatial frequency in the vertical direction in the vicinity of the phase difference detection pixel can be detected.

Here, in the case of the Bayer arrangement, two pixels, which are arranged to neighbor in the vertical direction in a manner to sandwich the phase difference detection pixel, are imaging pixels of an identical color which is different from the color of the phase difference detection pixel. However, it is not always necessary that these two pixels neighbor each other, and these two pixels may apart from each other. In addition, if the pixels are disposed in a manner to sandwich the phase difference detection pixel, the distances from the phase difference detection pixel may be different. Needless to say, the distances from the phase difference detection pixel may be equal.

Additionally, in the case of the phase difference detection pixel for detecting a vertical phase difference, the ratio between the pixel outputs of two pixels, which neighbor not in the vertical direction but in the horizontal direction, is detected.

After the frequency variation detection process, the picture pattern variation detector 3121c executes a picture pattern variation detection process (step S106).

As a concrete process of the picture pattern variation detection process, the ratio or difference of the values of pixel data between pixels of the same color in the vicinity of the phase difference detection pixel and imaging pixel, which were used in the level variation detection process, is detected. In the case of the example of FIG. 7B, as regards the right opening phase difference detection pixel Gr2, the ratio or difference of the values of pixel data between an imaging pixel Gb3 near the right opening phase difference detection pixel Gr2 and an imaging pixel Gb1 near the imaging pixel Gr1, is detected, as indicated by an arrow 2 in FIG. 7B. In addition, as regards the left opening phase difference detection pixel Gr3, the ratio or difference of the values of pixel data between an imaging pixel Gb4 near the left opening phase difference detection pixel Gr3 and the imaging pixel Gb1 near the imaging pixel Gr1 is detected.

In this picture pattern variation detection process, the variation of pixel outputs of the imaging pixels in the vicinity of the phase difference detection pixel and imaging pixel, which were used in the level variation detection process, is detected. In the case of these imaging pixels near the phase difference detection pixel and imaging pixel which were used in the level variation detection process, it can be thought that substantially the same image is formed on these imaging pixels. In this case, it can be thought that the variation of pixel outputs between the nearby imaging pixels is substantially due to the variation of an image (picture pattern). Actually, since the imaging pixels are those near the phase difference detection pixel and imaging pixel which were used in the level variation detection process, it is possible that an error occurs if the spatial frequency is high. Thus, from the detection result of the above-described frequency variation detection process, the reliability of the picture pattern variation detection process is determined.

Here, in the example of FIG. 7B, the two imaging pixels, the ratio of pixel outputs of which is detected in the picture pattern variation detection process, are the pixels of the same color as the phase difference detection pixel. However, it is not always necessary that these two imaging pixels have the same color as the phase difference detection pixel. It is desirable, however, that these two imaging pixels have the same color. In addition, although it is preferable that the distances from the two imaging pixels, the ratio of pixel outputs of which is detected, to their nearby phase difference detection pixel are equal, the distances may slightly be different.

In addition, in the case of the phase difference detection pixel for detecting the vertical phase difference, the ratio between pixel outputs of plural pixels, which neighbor not in the vertical direction but in the horizontal direction, is detected in the picture pattern variation detection process.

After the picture pattern variation detection process, the calculator 3121d calculates, with respect to each island region, a weighting factor W for correcting the result of the detection of the level variation detection process (step S107).

Hereinafter, an example of the calculation method of the weighting factor W is described. Incidentally, in this example, a description is given of an example of calculation of the weighting factor W for the right opening phase difference detection pixel. The weighting factor W according to one example is a factor which becomes closer to 1 as the ratio between the values of pixel data of two same-color imaging pixels in the same column in the vertical direction relative to the phase difference detection pixel, which is obtained as the result of the frequency variation detection process, is closer to 1. This weighting factor W can be calculated by using a Gaussian function, for example, as indicated by equation 1 below. Here, the same value of the weighting factor W, which is indicated by equation (1), is applicable to the right opening phase difference detection pixels in the same island region.

$$W = \exp\left(-\frac{(1 - \text{Dif\_B})^2}{\sigma}\right) \quad \text{(equation 1)}$$

Here, σ in equation 1 is a standard deviation, and is arbitrarily be set, for example, at a time of design. For example, when σ=0.1, the weighting factor W becomes a Gaussian function, with a standard deviation of 0.1. Dif_B in equation 1 is the ratio between the values of pixel data of two same-color imaging pixels in the same column in the vertical direction relative to the phase difference detection pixel, which is obtained as a result of the frequency variation detection process. For example, if the value of pixel data of the imaging pixel B2 is B2 and the value of pixel data of the imaging pixel B3 is B3, Dif_B that is the result of the frequency variation detection process is given by the following equation 2.

$$\text{Dif\_}B = B2/B3 \quad \text{(equation 2)}$$

In the above-described example, the weighting factor W is calculated by using a Gaussian function. However, it is not always necessary to execute the calculation by using the Gaussian function, if a method is used which can calculate a factor which becomes closer to 1 as the ratio between the values of pixel data of two same-color imaging pixels in the same column in the vertical direction is closer to 1.

After the weighting factor W is calculated, the calculator 3121d calculates a relational expression between the pixel output of the phase difference detection pixel and the image height (step S108).

Hereinafter, an example of the calculation method of the relational expression is described. In this example, the relationship between the pixel output of the phase difference detection pixel and the image height is approximated by a linear expression. For example, if a level variation amount, relative to an imaging pixel, of a phase difference detection pixel at a position of a horizontal coordinate x is y, the linear expression representing the level variation amount can be expressed by the form of y=ax+b. In addition, an inclination a and an intercept b of the linear expression are given by, for example, a least square method, as indicated by the following equation 3.

$$a[0] = \frac{(n-1)\sum_{i=start\_x}^{n-1}(i \times W) \times (\text{Dif\_p}Ri \times W) - \sum_{i=start\_x}^{n-1}(i \times W)\sum_{i=start\_x}^{n-1}(i \times W) \times (\text{Dif\_p}Ri \times W)}{(n-1)\sum_{i=start\_x}^{n-1}(i \times W)^2 - \left\{\sum_{i=start\_x}^{n-1}(i \times W)\right\}^2} \quad \text{(equation 3)}$$

$$b[0] = \frac{\sum_{i=start\_x}^{n-1}(i \times W)^2 \sum_{i=start\_x}^{n-1}(\text{Dif\_p}Ri \times W) - \sum_{i=start\_x}^{n-1}(i \times W) \times (W \times \text{Dif\_p}Ri)\sum_{i=start\_x}^{n-1}(i \times W)}{(n-1)\sum_{i=start\_x}^{n-1}(i \times W)^2 - \left\{\sum_{i=start\_x}^{n-1}(i \times W)\right\}^2}$$

Here, Dif_pRi (i=start_x, start_x+1, ..., n−1) in equation 3 is the ratio of the values of pixel data between the right opening phase difference detection pixel disposed on the horizontal coordinate x and its nearby imaging pixel, which is obtained from the result of the level variation detection process and the result of the picture pattern variation detection process. Dif_pRi is given by the following equation 4.

$$\text{Dif\_}pRi = 1 - \{(Gr1/Gr2) - \text{Dif\_}G\} \quad \text{(equation 4)}$$

Dif_G in equation 4 is the ratio of the values of pixel data between the two imaging pixels near the pixels used in the level variation detection process, which is obtained as a result of the picture pattern variation detection process. For instance, if the example of the right opening phase difference detection pixel Gr2 is illustrated, Dif_G is given by the following equation 5.

$$\text{Dif\_}G = 1 - Gb1/Gb3 \quad \text{(equation 5)}$$

In equation 4, the value of pixel data of the imaging pixel Gr1 is Gr1, and the value of pixel data of the phase difference detection pixel Gr2 is Gr2. In equation 4, the level variation amount obtained by the picture pattern variation detection process is subtracted from the level variation amount obtained by the level variation detection process. Thus, the level variation amount indicated by equation 4 is a decrease amount in light amount of the phase difference detection pixel relative to the imaging pixel, with consideration given to the influence of the angle of incident light on the phase difference detection pixel, and the image height.

In addition, the value "0" in brackets of a and b in equation 3 indicates that the inclination and intercept expressed thereby relate to the right opening phase difference detection pixel. On the other hand, as regards the left opening phase difference detection pixel, the value in brackets of a and b in equation 3 is set at "1", and the respective values indicated in equation 3 to equation 5 are replaced with values relating to the left opening phase difference detection pixel.

Incidentally, in the above-described example, the relationship between the level variation amount and the horizontal coordinate x is approximated by the linear expression, but it may be approximated by a higher-order expression. In addition, the method of approximation is not limited to the least square method, and use may be made of Lagrange's interpolation, spline interpolation, etc.

After the relational expression was calculated, the pixel correction unit 313 corrects the pixel output of each phase difference detection pixel (step S109). For example, in the level variation detection process, frequency variation detection process and picture pattern variation detection process, if the ratio between the values of pixel data is detected as a variation of the pixel output, "y" in equation 3 is also expressed by the ratio between the values of pixel data. Accordingly, the correction of the pixel output may be made by executing such gain adjustment that the pixel data of the phase difference detection pixel is multiplied by y which corresponds to the horizontal coordinate x of the phase difference detection pixel. On the other hand, in the level variation detection process, frequency variation detection process and picture pattern variation detection process, if the difference between the values of pixel data is detected as a variation of the pixel output, "y" in equation 3 is also expressed by the difference between the values of pixel data. Accordingly, the correction of the pixel output may be made by executing such gain adjustment that the pixel data of the phase difference detection pixel is offset by y which corresponds to the horizontal coordinate x of the phase difference detection pixel.

As described above, in the correction in step S102, the same correction as in step S109 is made. However, in step S102, correction is made by using the relational expression calculated in the relational expression calculation process of one frame before.

After the pixel correction process, the intersection calculator 3122 calculates an intersection (cross_x, cross_y) between the relational expression calculated with respect to the right opening phase difference detection pixel and the relational expression calculated with respect to the left opening phase difference detection pixel (step S110).

Figure 8A:
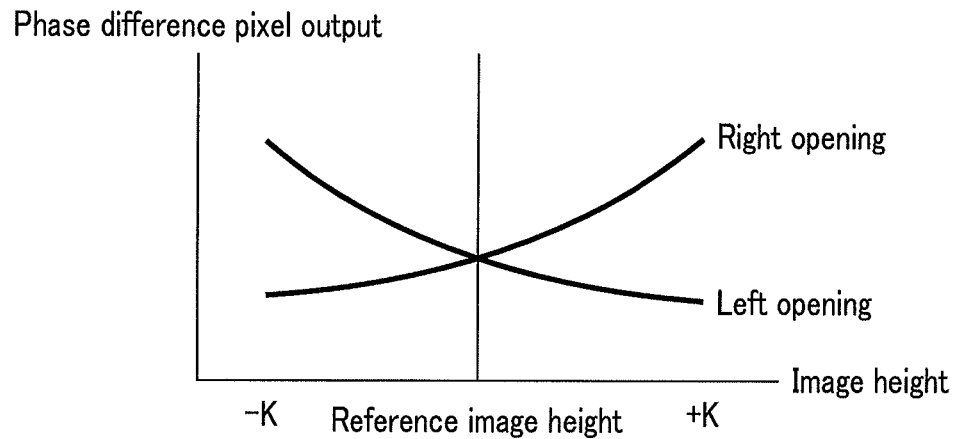
FIG. 8A is a first view illustrating the relationship between a pixel output of a phase difference detection pixel and an image height.
Figure 8B:
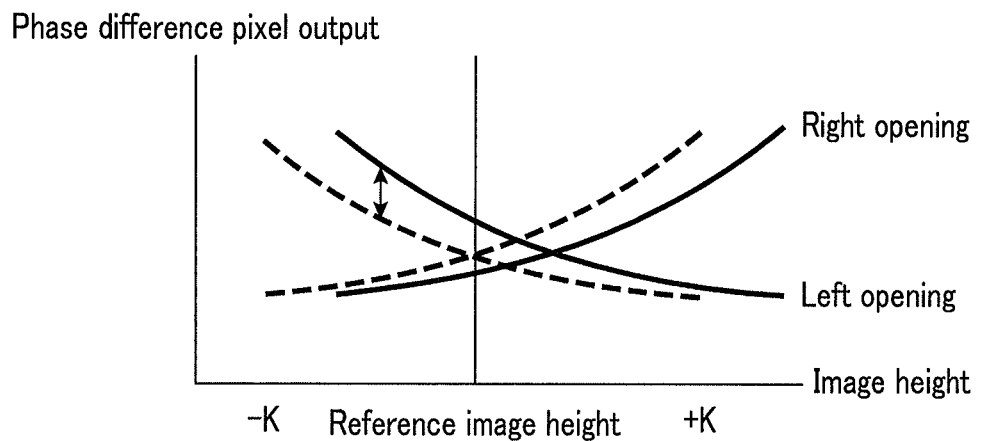
FIG. 8B is a second view illustrating the relationship between the pixel output of the phase difference detection pixel and the image height.

FIG. 8A and FIG. 8B are views illustrating the relationship between an image height and a pixel output of a phase difference detection pixel. FIG. 8A illustrates a relationship in a case of an ideal state in which the optical axis of the photographing lens 11 agrees with a reference position of image height (e.g. the center position of the image-capturing surface) which is set on the image-capturing surface. In addition, FIG. 8B illustrates a relationship in a case in which the optical axis of the photographing lens 11 deviates from the reference position of image height (e.g. the center position of the image-capturing surface) which is set on the image-capturing surface. Although approximation is made by the linear expression in equation 3, the pixel output of the phase difference detection pixel actually varies nonlinearly in relation to image height.

As illustrated in FIG. 8A, in the ideal state, the pixel output of the right opening phase difference detection pixel and the pixel output of the left opening phase difference detection pixel vary in line-symmetry with respect to the reference position of image height. In addition, the pixel output of the right opening phase difference detection pixel and the pixel output of the left opening phase difference detection pixel agree at the reference position of image height.

On the other hand, when there is a deviation of the optical axis of the photographing lens 11, as illustrated in FIG. 8B, the pixel output of the right opening phase difference detection pixel and the pixel output of the left opening phase difference detection pixel in relation to the image height vary from the case of the ideal state. In addition, the image height, at which the pixel output of the right opening phase difference detection pixel and the pixel output of the left opening phase difference detection pixel agree, deviates from the reference image height. The image height, at which the pixel output of the right opening phase difference detection pixel and the pixel output of the left opening phase difference detection pixel agree, corresponds to an intersection (cross_x, cross_y) between the relational expression calculated with respect to the right opening phase difference detection pixel and the relational expression calculated with respect to the left opening phase difference detection pixel. Therefore, by finding this intersection, it is possible to estimate the optical axis position on the image-capturing surface of the photographing lens 11 after the deviation from the ideal state.

The intersection (cross_x, cross_y) can be found by solving simultaneous linear equations with two variables using the relational expressions which were calculated with respect to a pair of phase difference detection pixels arranged in the phase difference detection direction, for example, the right opening phase difference detection pixel and left opening phase difference detection pixel in the case in which the phase difference detection direction is the horizontal direction. The solution of the simultaneous equations is expressed by the following equation 6.

$$\text{cross\_x} = \frac{\begin{vmatrix} b[0] & 1 \\ b[1] & 1 \end{vmatrix}}{\begin{vmatrix} -a[0] & 1 \\ -a[1] & 1 \end{vmatrix}} \quad \text{(equation 6)}$$

$$\text{cross\_y} = \frac{\begin{vmatrix} -a0 & b[0] \\ -a[1] & b[1] \end{vmatrix}}{\begin{vmatrix} -a[0] & 1 \\ -a[1] & 1 \end{vmatrix}}$$

After the coordinates of the intersection are calculated, the image processor 31 executes an image process on the imaging data (step S111). Here, the image processor 31 executes an image process (from the synchronization process to the color reproduction process) on the imaging data obtained as the result of the pixel output correction process of step S109. Process parameters for recording are used as process parameters which are used in the image process. It is assumed that the process parameters for recording are prestored in, for example, the ROM 43.

Next, the distortion correction unit 319 executes a distortion correction process on the image data obtained by the image process (step S112). Here, the distortion correction unit 319 executes coordinate conversion for distortion correction, so that the position of the intersection, which was calculated in step S110, becomes the center of the image data after correction.

Next, the chromatic aberration correction unit 320 executes a chromatic aberration distortion correction process on the image data obtained by the image process (step S113). Here, the chromatic aberration correction unit 320 executes alignment of image data of R, G and B, so that the position of the intersection, which was calculated in step S110, becomes the center of the image data after correction.

Next, the CPU 29 records the image data, which was temporarily stored in the DRAM 41 as the result of the chromatic aberration correction process, in the recording medium 45 (step S114). Subsequently, the CPU 29 determines whether or not to stop the moving picture recording (step S115). Here, the CPU 29 determines the operation state of the release button of the operation unit 19. Specifically, when the release button was pressed once again, the CPU 29 determines that the moving picture recording is to be stopped.

In step S115, if it is determined that the moving picture recording is not to be stopped, the CPU 29 returns the process to step S101, and continues the moving picture recording. On the other hand, if it is determined in step S115 that the moving picture recording is to be stopped, the CPU 29 terminates the process of FIG. 6.

As has been described above, in the present embodiment, the variation of pixel outputs between the phase difference detection pixel and its nearby imaging pixel is actually detected. In accordance with the result of the detection, the relational expression is calculated which represents the relationship between the pixel output of the phase difference detection pixel and the image height. By this relational expression, the optical axis position on the image-capturing surface of the photographing lens 11 can be estimated. Thereby, even if an optical axis deviation occurs due to the variance in manufacture of the photographing lens 11, or the like, the distortion correction process or chromatic aberration correction can properly be executed.

Additionally, in the present embodiment, by the relational expression which represents the relationship between the pixel output of the phase difference detection pixel and the image height, the gain adjustment amount of each phase difference detection pixel is calculated, and the pixel output correction process is executed. Thereby, it is possible to correct the pixel output of the phase difference detection pixel, with consideration given to the influences of the area of the light shield film formed on each phase difference detection pixel, the position of the light shield film, the angle of incident light on the phase difference detection pixel, and the image height. Besides, in this embodiment, the pixel output correction process is executed prior to the distortion correction process and chromatic aberration correction. By executing the pixel output correction process prior to the processes which involve coordinate conversion, such as the distortion correction process and chromatic aberration correction, the precision of the pixel output correction process can be enhanced. Moreover, prior to the focus detection process, the pixel output of each phase difference detection pixel is corrected based on the relational expression representing the relationship between the pixel output of the phase difference detection pixel and the image height. Thereby, even if an optical axis deviation of the photographing lens 11 occurs, the precision of the focus detection does not deteriorate.

Additionally, in the present embodiment, the variation of pixel outputs between the phase difference detection pixel and its nearby imaging pixel is not merely detected, but the variation of pixel outputs between nearby imaging pixels of the respective pixels is detected, and the gain adjustment amount is corrected in accordance with this detection result. Thereby, it is also possible to correct an error in a case in which different images are formed on the phase difference detection pixel and the imaging pixel.

Furthermore, in the present embodiment, the result of the picture pattern variation detection process is corrected, with consideration given to the variation of the spatial frequency in the vicinity of the phase difference detection pixel. Thereby, the precision of the gain adjustment can be further enhanced. Here, although the frequency variation detection process is necessary in order to enhance the reliability of the picture pattern variation detection process, the frequency variation detection process may be omitted.

[Modification 1]

Hereinafter, modifications of the above-described embodiment will be described. In the above-described embodiment, as examples of use of the intersection (the actual position of the optical axis of the photographing lens 11 on the image-capturing surface) calculated by the intersection calculator 3122, the distortion correction process and chromatic aberration correction process are illustrated. The technique of the present embodiment is applicable to correction processes of various optical characteristics, other than the distortion correction process and chromatic aberration correction process. For example, the technique of the present embodiment may be applied to a shading correction process. The shading correction process is a process of correcting a decrease in light amount in a peripheral part of an image, which occurs due to the characteristics of the photographing lens 11. Also in the shading correction process, proper correction can be made by executing gain correction, centering on the intersection calculated by the intersection calculator 3122.

[Modification 2]

In the above-described example, the weighting factor W is the Gaussian function. Aside from this, for example, calculation can be made by approximation using a threshold value. In addition, the linear expression representing the level variation amount can be given not by the least square method, but by break-point approximation. Modification 2 is an example in which the weighting factor W and the inclination a and intercept b of the linear expression representing the level variation amount are found by such another method.

In this modification, as illustrated in FIG. 9, an m-number of break points (three break points 1, 2 and 3 in the Figure) are set within one island region, and then the level variation detection process, frequency variation detection process and picture pattern variation detection process, which are the same as described above, are executed. In this case, the weighting factor W can be found by separately setting cases of the average value of Dif_G and Dif_B; based on threshold values, as indicated by the following equation 7.

$$W = \begin{cases} 3 & (\text{Dif\_B} + \text{Dif\_G})/2 < 0.1 \\ 2 & (\text{Dif\_B} + \text{Dif\_G})/2 < 0.3 \\ 1 & \text{otherwise} \end{cases} \quad \text{(equation 7)}$$

Dif_G in equation 7 is the absolute value of the ratio of the values of pixel data between the two imaging pixels near the pixels used in the level variation detection process, which is obtained as the result of the picture pattern detection process.

For example, if the above-described right opening phase difference detection pixel Gr2 is one of the break points, Dif_G is given by the following equation 8.

$$Dif\_G = abs(1 - Gb1/Gb3) \quad \text{(equation 8)}$$

Dif_B in equation 7 is the absolute value of the ratio between the values of pixel data of two same-color imaging pixels in the same column in the vertical direction relative to the phase difference detection pixel, which is obtained as the result of the frequency variation detection process. For example, if the value of the pixel data of the imaging pixel B2 is B2 and the value of the pixel data of the imaging pixel B3 is B3, Dif_B is given by the following equation 9.

$$Dif\_B = abs(1 - B2/B3) \quad \text{(equation 9)}$$

In addition, the inclination a and intercept b of the linear expression, y=ax+b, representing the level variation amount, is given by the following equation 10.

$$a\_m = \begin{cases} \dfrac{(p\_m+1 - p\_m)}{n-1} & p\_m < p\_m+1 \\ -\dfrac{(p\_m - p\_m+1)}{n-1} & \text{otherwise} \end{cases} \quad \text{(equation 10)}$$

$$b\_m = (n-1) - (a\_m \times p\_m + 1)$$

Here, a_m and b_m (m=1, 2) in equation 10 indicate, respectively, the inclination and intercept of the linear equation indicating the level variation amount from a break point m to a break point m+1. In addition, p_m (m=1, 2) is given by the following equation 11.

$$p\_m = \frac{\sum_{i=start\_x}^{n-1} Dif\_pRi \times W}{\sum_{i=start\_x}^{n-1} W} \quad \text{(equation 11)}$$

Here, Dif_pRi (i=start_x, start_x+1, ..., n−1) in equation 11 is the ratio of the values of pixel data between the phase difference detection pixel disposed on the horizontal coordinate x and its nearby imaging pixel, which is obtained from the result of the level variation detection process and the result of the picture pattern variation detection process. Dif_pRi is given by the following equation 12.

$$Dif\_pRi = 1 - \{(Gr1/Gr2) - Dif\_G\} \quad \text{(equation 12)}$$

In addition, in the above-described example, the starting x coordinate in the horizontal direction of the phase difference detection pixel in each island region is defined as "start_x". However, in the modification, it is assumed that the x coordinate of each break point is defined as "start_x", and an n-number of pixels are arranged between break points.

The same calculations as indicated in the above equations 7 to 12 are executed on the left opening phase difference detection pixel, and the intersection between the relational expression, which was calculated with respect to the right opening phase difference detection pixel, as indicated in equation 11, and the relational expression, which was calculated with respect to the left opening phase difference detection pixel, as indicated in equation 11, becomes the intersection (cross_x, cross_y).

[Modification 3]

In each of the above-described examples, although the optical axis position is estimated during moving picture photography, the optical axis position may be estimated in advance at a time of adjustment of the camera 1. FIG. 10 is a flowchart in a case of estimating the optical axis position at a time of adjustment. The process of FIG. 10 is executed when the photographing lens 11 has been attached to the camera 1 and the camera 1 has been activated for adjustment. The process of steps S201 to S208 in FIG. 10 is identical to the process of steps S101, S103 to S108, and S109 in FIG. 6. Thus, a description thereof is omitted. After the intersection (cross_x, cross_y) was calculated in step S208, the CPU 29 stores in the ROM 43 the information of the calculated intersection (cross_x, cross_y) as the position information of the optical axis of the photographing lens 11 on the image-capturing surface (step S209). If the photographing lens 11 is attachably/detachably constructed, the information of the intersection may be stored in a ROM in the photographing lens 11.

In this Modification 3, by estimating the position of the optical axis in advance at the time of adjustment of the camera 1, the processes, such as the distortion correction process, can be executed by using this estimated value at the time of photography. In short, the process of step S110 in FIG. 6 can be omitted.

Although the present invention has been described above based on the embodiments, the present invention is not limited to the above-described embodiments, and, needless to say, various modifications and applications are possible within the scope of the spirit of the invention. As regards the above-described flowcharts of operations, the flowcharts do not mean that it is indispensable to execute the operations in the illustrated order.

Additionally, the processes according to the above-described embodiments can be stored as programs which can be executed by the CPU 29. Besides, the programs can be stored in a storage medium of an external storage device, such as a memory card (ROM card, RAM card, etc.), a magnetic disk (floppy disk, hard disk, etc.), an optical disc (CD-ROM, DVD, etc.), or a semiconductor memory, and can be distributed. In addition, the CPU 29 reads in the programs, which are stored in the storage medium of the external storage device, and the operation is controlled by the read-in programs. Thereby, it is possible to execute the above-described processes.

The above-described embodiments include inventions in various stages, and various inventions can be derived from proper combinations of structural elements disclosed herein. For example, even if some structural elements are omitted from all the structural elements disclosed in the embodiments, if the problem as described above can be solved and the advantageous effect as described above can be achieved, the structure without such structural elements can be derived as an invention.

What is claimed is:

1. An imaging apparatus comprising:
   an image-capturing element configured such that a phase difference detection pixel for detecting a focus is provided in a part of imaging pixels;
   an optical axis position estimation processor configured to estimate an optical axis position of an optical system configured to form an image of a subject on an image-capturing surface of the image-capturing element, from a pixel output of the phase difference detection pixel and a pixel output of the imaging pixel; and
   a pixel correction unit configured to correct pixel outputs of the respective phase difference detection pixels,
   wherein the optical axis position estimation processor includes:

a relationship calculator configured to calculate a relationship between the pixel output of the phase difference detection pixel and an image height, from the pixel output of the phase difference detection pixel and a pixel output of an image pixel near the phase difference detection pixel; and an optical axis position calculator configured to calculate the optical axis position, from the relationship calculated with respect to each of a pair of the phase difference detection pixels arranged in a detection direction of a phase difference, and wherein the pixel correction unit corrects pixel outputs of the respective phase difference detection pixels in accordance with the relationship.

2. The imaging apparatus of claim 1, wherein the pair of the phase difference detection pixels have different positions of openings, and the relationship calculator is configured to calculate the relationship with respect to each of the positions of the openings of the phase difference detection pixels.

3. The imaging apparatus of claim 1, wherein the relationship calculator is configured to calculate the relationship, from a ratio between the pixel output of the phase difference detection pixel and the pixel output of the image pixel near the phase difference detection pixel, or from a difference between the pixel output of the phase difference detection pixel and the pixel output of the image pixel near the phase difference detection pixel.

4. The imaging apparatus of claim 1, wherein the relationship calculator includes:

a level variation detector configured to detect a variation of the pixel output of the phase difference detection pixel and the pixel output of the imaging pixel which has the same color as the phase difference detection pixel and is located in a direction different from the detection direction of the phase difference by the phase difference detection pixel;

a frequency variation detector configured to detect a variation of pixel outputs between a plurality of imaging pixels which are located in a direction different from the detection direction of the phase difference and have a color different from a color of the phase difference detection pixel; and a picture pattern variation detector configured to detect a picture pattern variation, from a variation of pixel outputs between imaging pixels which are located near the phase difference detection pixel and the imaging pixel, the variation of the pixel outputs detected by the level variation detector.

5. The imaging apparatus of claim 1, wherein an influence of optical characteristics of the optical system upon the pixel outputs from the imaging pixel and the phase difference detection pixel is corrected in accordance with the optical axis position calculated by the optical axis position calculator, and the pixel correction unit is configured to execute correction of the pixel outputs, prior to the correction of the influence of the optical characteristics.

6. An imaging apparatus comprising:

an image-capturing element configured such that a phase difference detection pixel for detecting a focus is provided in a part of imaging pixels;

an optical axis position estimation processor configured to estimate an optical axis position of an optical system configured to form an image of a subject on an image-capturing surface of the image-capturing element, from a pixel output of the phase difference detection pixel and a pixel output of the imaging pixel; and a pixel correction unit configured to correct pixel outputs of the respective imaging pixels and outputs of the respective phase difference detection pixels in accordance with the relationship, wherein the optical axis position estimation processor includes:

a relationship calculator configured to calculate a relationship between the pixel output of the phase difference detection pixel and an image height, from the pixel output of the phase difference detection pixel and a pixel output of an image pixel near the phase difference detection pixel; and an optical axis position calculator configured to calculate the optical axis position, from the relationship calculated with respect to each of a pair of the phase difference detection pixels arranged in a detection direction of a phase difference, and wherein the correcting unit corrects an influence of optical characteristics of the optical system upon the pixel outputs from the imaging pixel and the phase difference detection pixel, in accordance with the optical axis position calculated by the optical axis position calculator.

7. The imaging apparatus of claim 6, further comprising a storage unit configured to store information of the optical axis position calculated by the optical axis position calculator.

8. An image correction method comprising:

calculating a relationship between a pixel output of a phase difference detection pixel of an image-capturing element and an image height, from the pixel output of the phase difference detection pixel and a pixel output of an image pixel near the phase difference detection pixel, the image-capturing element being configured such that the phase difference detection pixel, which is configured to detect a focus, is provided in a part of the imaging pixels;

calculating an optical axis position of an optical system, from the relationship calculated with respect to each of a pair of the phase difference detection pixels arranged in a detection direction of a phase difference;

storing the calculated optical axis position in a storage unit; and correcting an influence of optical characteristics of the optical system upon the pixel outputs from the imaging pixel and the phase difference detection pixel, in accordance with information of the optical axis position stored in the storage unit.

9. An image processing apparatus which processes a pixel output from an image-capturing element including a phase difference detection pixel and an imaging pixel which are arranged in a detection direction of a phase difference between images obtained by dividing a pupil, the apparatus comprising:

a first pixel output variation detector configured to detect a variation of a pixel output of the phase difference detection pixel and a pixel output of the imaging pixel which has the same color as the phase difference detection pixel and is located in a direction different from the detection direction of the phase difference by the phase difference detection pixel;

a second pixel output variation detector configured, to detect a variation of pixel outputs between a plurality of imaging pixels which are located near the phase difference detection pixel and the imaging pixel, which were used by the first pixel output variation detector in order to detect the variation of the pixel outputs; and a pixel correction unit configured to correct pixel outputs of the respective phase difference detection pixels, from results of the first pixel output variation detector and the second pixel output variation detector.

10. An image processing method for processing a pixel output from an image-capturing element including a phase difference detection pixel and an imaging pixel which are arranged in a detection direction of a phase difference, the method comprising:
  detecting, by a first pixel output variation detector, a variation of a pixel output of the phase difference detection pixel and a pixel output of the imaging pixel which has the same color as the phase difference detection pixel and is located in a direction different from the detection direction of the phase difference by the phase difference detection pixel;
  detecting, by a second pixel output variation detector, a variation of pixel outputs between a plurality of imaging pixels which are located near the phase difference detection pixel and the imaging pixel, which were used by the first pixel output variation detector in order to detect the variation of the pixel outputs; and
  correcting, by a pixel correction unit, pixel outputs of the respective phase difference detection pixels, from results of the first pixel output variation detector and the second pixel output variation detector.

* * * * *